US009238392B2

(12) United States Patent
Geiger et al.

(10) Patent No.: US 9,238,392 B2
(45) Date of Patent: Jan. 19, 2016

(54) AIR SUSPENSION DEVICE FOR VEHICLES, HAVING INDIVIDUAL CONTROL AND ONLY ONE PRESSURE SENSOR

(71) Applicants: Winifried Geiger, Muehlacker (DE); Guenther Fecht, Freiberg (DE)

(72) Inventors: Winifried Geiger, Muehlacker (DE); Guenther Fecht, Freiberg (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 96 days.

(21) Appl. No.: 13/959,245

(22) Filed: Aug. 5, 2013

(65) Prior Publication Data

US 2013/0320646 A1    Dec. 5, 2013

Related U.S. Application Data

(63) Continuation of application No. 11/115,858, filed on Apr. 26, 2005, now abandoned.

(51) Int. Cl.
 B60G 11/27  (2006.01)
 B60G 17/052  (2006.01)

(52) U.S. Cl.
 CPC ............ *B60G 11/27* (2013.01); *B60G 17/0523* (2013.01); *B60G 2300/02* (2013.01); *B60G 2400/252* (2013.01); *B60G 2400/51222* (2013.01); *B60G 2500/2012* (2013.01); *B60G 2500/2046* (2013.01); *B60G 2500/30* (2013.01)

(58) Field of Classification Search
 CPC .... B60T 8/3655; B60T 13/148; B60T 8/5012

USPC .......................................... 267/64.28, 64.16
 See application file for complete search history.

(56) References Cited

U.S. PATENT DOCUMENTS

| 4,484,784 | A | 11/1984 | Leiber |
| 4,834,418 | A | 5/1989 | Buma et al. |
| 5,156,449 | A | 10/1992 | Wetzel |
| 5,193,063 | A | 3/1993 | Assh |
| 5,711,582 | A | 1/1998 | Koike |
| 2001/0017449 | A1 | 8/2001 | Stiller |

FOREIGN PATENT DOCUMENTS

| DE | 195 15 255 | 10/1996 |
| EP | 0 170 794 | 5/1985 |
| EP | 1 321 320 | 6/2003 |

*Primary Examiner* — Robert A Siconolfi
*Assistant Examiner* — Mahbubur Rashid
(74) *Attorney, Agent, or Firm* — Kenyon & Kenyon LLP

(57) ABSTRACT

An air suspension device for vehicles, in particular for commercial vehicles, including a valve block for aerating a plurality of air-spring bellows with compressed air from a compressed-air supply or for venting the air-spring bellows through an air vent, the valve block including at least one air-bellows valve assigned to an air-spring bellows or a group of air-spring bellows of the plurality of air-spring bellows, for individually aerating and venting this air-spring bellows or group of air-spring bellows. The present system provides for the valve block to additionally include a valve device, by which the at least one air-bellows valve may be simultaneously decoupled from the compressed-air supply and the air vent, and for a pressure sensor for measuring the air pressure in the flow path between the valve device and the at least one air-bellows valve to be provided on the other side of the corresponding air-spring bellows.

18 Claims, 2 Drawing Sheets

AIR SUSPENSION DEVICE FOR VEHICLES, HAVING INDIVIDUAL CONTROL AND ONLY ONE PRESSURE SENSOR

PRIORITY APPLICATION INFORMATION

This application claims priority to U.S. patent application Ser. No. 11/115,858, filed Apr. 26, 2005, and German patent application no. 10 2004 020 527.2, which was filed in the German patent office on Apr. 26, 2004, both of which are hereby incorporated by reference.

FIELD OF THE INVENTION

The present invention relates to an air suspension device for vehicles, having individual control and a pressure sensor.

BACKGROUND INFORMATION

The present system is based on an air-suspension device for vehicles, in particular for commercial vehicles, having a valve block for aerating a plurality of air-spring bellows with compressed air from a compressed-air supply, or for bleeding (venting) the air-spring bellows through an air vent, the valve block having at least one air-bellows valve assigned to an air-spring bellows or a group of air-spring bellows of the plurality of air-spring bellows, for individually aerating or venting this air-spring bellows or group of air-spring bellows.

In the case of modern commercial vehicles, it is required that the axle loads be determined, in particular the distribution of the loads to the front and rear axles and, if present, to a leading or trailing axle or lifting axle. In the case of a known air-suspension device of the species, so-called individual control is implemented, where, for example, the rear axle is controlled via two channels and the air-spring bellows of a lifting axle form an additional channel and are jointly controlled. A further channel is provided for the lifting bellows of the lifting axis. This then requires up to seven pressure sensors, which measure the pressure in the specific air-spring bellows and allow one to draw a conclusion about the loads supported by it. When pressure sensors are mounted directly on the air-spring bellows, the corresponding pneumatic tubing and the electrical wiring are complicated and expensive. In the case of pressure sensors mounted in the air-bellows valves, a pressure supply, as well as space for a printed circuit board and a protective circuit, must be provided for each pressure sensor.

SUMMARY OF THE INVENTION

The present system is based on the object of further developing an air-suspension device of the type mentioned at the outset in such a manner, and that it is less expensive to manufacture.

This object of the exemplary embodiment of the present invention may be achieved by the exemplary embodiments of the present invention as described herein.

The exemplary embodiment of the present invention provides that the valve block continues to include a valve device, by which the at least one air-bellows valve may be simultaneously decoupled from the compressed-air supply and the air vent, and that a pressure sensor for measuring the air pressure in the flow path between the valve device and the at least one air-bellows valve is provided on the other side of the corresponding air-spring bellows. On the other side of the air-spring bellows means that the pressure sensor is not situated on the side of the air-bellows valve on which the corresponding air-spring bellows is located, but rather on the side opposite to the air-spring bellows. The pressure sensor is then situated at a central point with respect to the flow path between the valve device and the air-bellows valves. The valve device ensures that the pressure in the flow path between the valve device and the respective air-bellows valve does not dynamically change, and that a constant pressure sets in. Consequently, the pressure sensor is not acted upon by the dynamic air-bellows pressures, but advantageously by the static air-bellows pressures necessary for measuring load. By sequentially connecting the air-bellows valves through, the pressure sensor may be connected to the respective air-spring bellows for individually measuring pressure, which means that only a single pressure sensor is sufficient for any number of air-spring bellows or lifting bellows. Consequently, the exemplary embodiment of the present invention allows a number of pressure sensors to be dispensed with, along with the associated tubing and wiring.

Advantageous further refinements of, and improvements to, the present system are described herein.

The valve block containing the valve device, and the pressure sensor, may be assigned to one axle of a commercial vehicle, in particular a rear axle, the valve block assigned to the one axle simultaneously allowing air-spring bellows assigned to at least one further axle, in particular a front axle and a lift axle, to be aerated or vented. Pressure is then supplied to, or removed from, all of the air-bellows valves of the commercial vehicle by a single valve block, which results in an advantageously low number of valves. In addition, a single pressure sensor, which is situated in a pneumatically central position, is sufficient for measuring the pressure of the air-spring bellows at all of the axles.

According to a further measure, the pressure sensor may be connected in a pressure-conducting manner to the air-spring bellows or the group of air-spring bellows of the specific axle by connecting the air-bellows valves assigned to the air bellows through, in order to measure the static pressure there. By individually switching the air-bellows valves, the pressure sensor may be connected to all the air-spring bellows and the static pressure in all of the air-spring bellows may therefore be determined, with the aid of which the loading state of the commercial vehicle or the load distribution may be deduced. If, for example, in the case of an adjusted setpoint level, the air-bellows valves assigned to the air-spring bellows of the rear axle, and also the valve device connected in incoming circuit, are in the blocked position because of a lack of need for further aeration and the load state at the rear axle should be ascertained, only the air-bellows valves of the rear axle are opened, whereupon the pressure prevailing there may be measured by the pressure sensor. Since the valve device connected in incoming circuit to the air-bellows valves always remains closed during such a pressure measurement and the air-spring bellows are consequently decoupled from the compressed-air supply and the air vent, no aeration or venting of the air-spring bellows is possible, and consequently, no pressure change is possible, which could invalidate the measuring result.

According to a first specific embodiment, the valve block of the rear axle includes a 3/2-way directional control valve, which connects either the air vent or the compressed-air supply to a connection of the valve device. In this case, the valve device may be formed by a 2/2-way directional control valve, which either switches the connection through to the air-bellows valves or blocks it.

According to a further specific embodiment, the valve device includes a 2/2-way directional control valve, which either switches the air vent through to the air-bellows valves or blocks this flow path. In this case, the valve device may include an additional 2/2-way valve, which either switches the compressed-air supply through to the air-bellows valves or blocks this flow path.

On at least the rear axle and on the lifting axle, the air-spring bellows of each vehicle side should be assigned a 2/2-way directional control valve in the form of an air-bellows valve, and at least some of the valves of the valve block should be solenoid valves having a pneumatic pilot-operation connection for pneumatic-electric pilot operation. In addition, the valve block, the pressure sensor, as well as an electronic control unit for the pneumatic-electric pilot operation may be integrated in one unit, which gives rise to a compact size.

A further valve block assigned to the front axle may include a 3/2-way directional control valve, by which the air-spring bellows of the front axle are interconnected via a throttle device or connected to the air-bellows valves of the other axles.

In the above-described variants, air-suspension devices have the advantage that both constant-pressure control and also individual-pressure control may be realized by a single set-up. Further details are derived from the following description of the exemplary embodiments.

DETAILED DESCRIPTION

Figure 1:
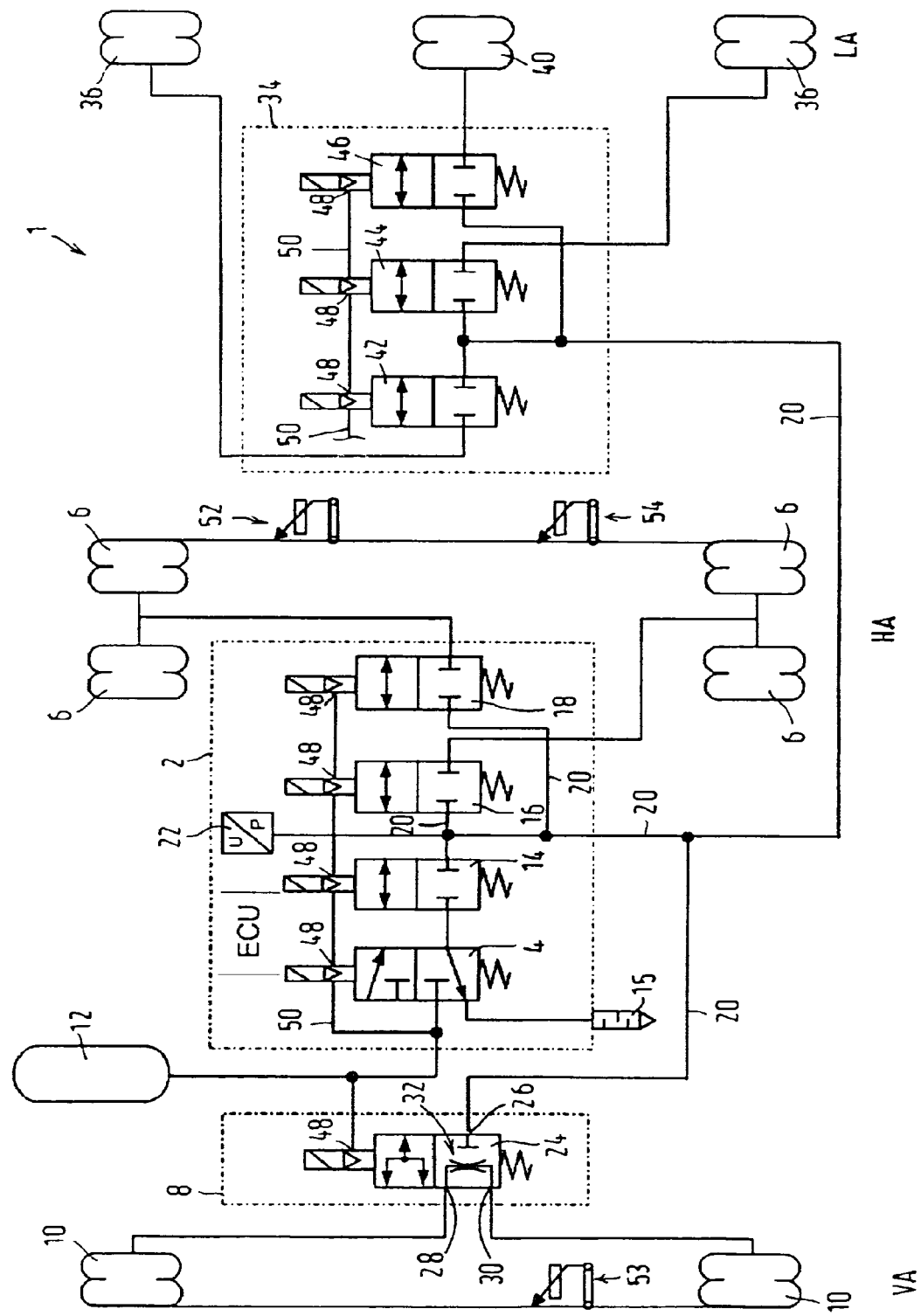
FIG. 1 shows a schematic functional circuit diagram of an air-suspension devices according to a first specific embodiment of the present invention.

The specific embodiment of an air-suspension device of a commercial vehicle referred to as a whole by reference numeral 1 in FIG. 1 includes a valve block 2 that is assigned to a driven rear axle HA and contains a central 3/2-way directional control valve 4 for aerating and venting air-spring bellows 6 of the rear axle, and a valve block 8 assigned to a front axle VA for aerating and venting air-spring bellows 10 of front axle VA.

Central 3/2-way directional control valve 4 of valve block 2 assigned to rear axle HA connects either a compressed-air supply 12 to a pressure connection of a 2/2-way directional control valve 14, or the latter to an air vent (bleeder) 15. An additional pressure connection of 2/2-way directional control valve 14 is connected to pressure connections of downstream air-bellows valves assigned to air-spring bellows 6 on each vehicle side of rear axle HA; the air-bellows valves taking the form of 2/2-way directional control valves 16, 18, whose additional pressure connections are connected to air-spring bellows 6 of rear axle HA. Furthermore, the pressure connection of 2/2-way directional control valve 14 on the side of air-bellows valves 16, 18 is connected to a pressure sensor 22 via a pressure line 20. Pressure sensor 22 measures the pressure in pressure line 20, in particular in a pressure connection between 2/2-way directional control valve 14 and air-bellows valves 16, 18, on the other side of air-spring bellows 6. Pressure connection 20 may take, for example, the form of a pressure channel in valve block 2. In the form of 2/2-way directional control valves, the two air-bellows valves 16, 18 either connect air-spring bellows 6 of rear axle HA assigned to them, through to the pressure connection of 2/2-way directional control valve 14 or block such a connection.

Valve block 8 assigned to front axle VA also includes a 3/2-way directional control valve 24, which functions as an above-described air-bellows valve and, depending on its switch position, either connects its supply-pressure connection 26 to connections 28, 30 of air-spring bellows 10 of front axle VA or, in a drive position, additionally interconnects the two connections 28, 30 via a throttle 32 and blocks supply-pressure connection 26. Supply-pressure connection 26 of valve block 8 is connected, in turn, to pressure line 20 and, in particular, to the pressure connection of 2/2-way directional control valve 14, and to pressure sensor 22.

A further valve block 34 assigned to a lifting axle LA includes two air-spring bellows 36 for the right and left sides of lifting axle LA, as well as a lifting bellows 40 for raising and lowering lifting axle LA, which may be a leading or a trailing axle. In this context, the two air-spring bellows 36 and lifting bellows 40 of lifting axle LA are each assigned a 2/2-way directional control valve 42, 44, 46 in the form of air-bellows valves, of which, in each instance, one pressure connection is connected to pressure line 20 and the other pressure connection is connected to respective air-spring bellows 36, 40. Consequently, pressure sensor 22 is connected to all air-bellows valves 16, 18, 24, 42, 44, 46 by pressure line 20.

All valves 4, 16, 18, 24, 42, 44, and 46 may take the form of pneumatically pilot-operated solenoid valves, i.e. they are each controlled by a relay valve, which is not shown for reasons of scale and is controlled, for its part, electrically. The electrical control of valves 4, 16, 18, 24, 42, 44, and 46 is implemented by an electronic control unit ECU. To supply compressed air for the pilot operation, each control connection 48 of solenoid valves 4, 16, 18, 24, 42, 44, and 46 is connected to compressed-air supply 12 via a pneumatic line 50.

Two level sensors, a level sensor 52 assigned to the right side and a level sensor 54 assigned to the left side, measure the distance between rear axle HA and the vehicle body with the aid of rotary potentiometers, whose voltage taps are each connected to rear axle HA by a control lever. An additional level sensor 53 of this type is assigned to front axle VA. Level sensors 52, 53, 54 are connected to electronic control unit ECU so as to allow signal transmission. Valve block 2 of rear axle HA, pressure sensor 22, as well as electronic control unit ECU for the pneumatic-electric pilot operation are integrated in one unit, for example, by accommodating these components in a common housing made of plastic or die-cast aluminum.

Against this background, the method of functioning of air-suspension device 1 according to the exemplary embodiment of the present invention is as follows:

If the commercial vehicle is loaded when lifting axle LA is lowered, then air-spring bellows 6, 10, and 36 are compressed and the vehicle body sinks. The levers connected to rear axle HA and front axle VA rotate the sliders of the rotary potentiometers of level sensors 52, 53, 54, on the respective potentiometer paths, into the "raising" position. Control unit ECU detects the voltage deviation and transmits electrical actuating signals to 3/2-way directional control valve 4 and the two lifting-bellows valves 16, 18 of valve block 2 assigned to rear axle HA, to 3/2-way valve 24 of valve block 8 assigned to front axle VA, as well as to the two air-bellows valves 42, 44 assigned to air-spring bellows 36 of lifting axle LA (energized state).

As a result, 3/2-way directional control valve 4 of valve block 2 assigned to rear axle HA switches into its aeration position, in which compressed-air supply 12 is connected to the pressure connection of 2/2-way directional control valve 14, which connects the pressure through to the pressure connections of downstream air-bellows valves 16, 18, which, for their part, connect this pressure through to air-spring bellows 6 of rear axle HA. At the same time, this pressure is present in pressure line 20 between 2/2-way directional control valve 14 and the two air-bellows valves 16, 18 and is directed, via these air-bellows valves, into supply-pressure connection 26 of 3/2-way directional control valve 24 of valve block 8, which is assigned to front axle VA and redirects it (the pressure) to air-spring bellows 10 of front axle VA. At the same time, the pressure of compressed-air supply 12 is also applied, via pressure line 20, to the pressure connections of air-bellows valves 42, 44 of lifting axle LA, which are in the connected-through position.

In this manner, air-spring bellows 6, 10, 36 of rear, front, and lifting axles HA, VA, LA are aerated and the vehicle body as a whole is raised to the desired setpoint level. By appropriately controlling air-bellows valves 16, 18, 42, 44 of rear axle HA and lifting axle LA in an individual manner, the levels of the two vehicle sides may be variably adjusted, which can be necessary in the case of eccentric loading. It is likewise possible for the levels of rear axle HA, front axle VA, and lifting axle LA to be different (or varied) by appropriately controlling air-bellows valves 16, 18, 24, 42, 44. Consequently, the described set-up of air-suspension device 1 allows not only individual control, but also constant-pressure control to be implemented, by controlling the two air-bellows valves 16, 18 of the rear axle and the lifting axle 42, 44 simultaneously and by side, a switchover alternately taking place between the right and left vehicle sides. The specific control algorithm may optionally be programmed in control unit ECU.

In the driving position, i.e. when the level of the vehicle body is adjusted to the setpoint level, all solenoid valves 4, 14, 16, 18, 24, 42, 44, and 46 are not energized and are in switch positions, in which air-spring bellows 6, 10, 36 are blocked from both compressed-air supply 12 and air vent 15, which means that no compressed air may flow out of air-spring bellows 6, 10, 36 or into them.

After the desired level is set, pressure sensor 22 may be connected to all air-spring bellows 6, 10, 36, and consequently, in each instance, the prevailing static pressure, with the aid of which the loading state of the commercial vehicle or the load distribution may be deduced, may be ascertained by individually switching air-bellows valves 16, 18, 24, 42, 44. If, e.g. in the case of an adjusted setpoint level, air-bellows valves 16, 18 assigned to air-spring bellows 6 of rear axle HA and also 2/2-way directional control valve 14 connected in incoming circuit are in the blocked position because of the lack of need for further aeration, and the loading state at rear axle HA should be ascertained, then only the two air-bellows valves 16, 18 are opened, whereupon the pressure prevailing in air-spring bellows 6 of rear axle HA is also applied in pressure line 20 between air-bellows valves 16, 18 and 2/2-way directional control valve 14 that continues to be blocked, and the pressure may therefore be measured by pressure sensor 22. Since 2/2-way directional control valve 14 connected in incoming circuit to air-bellows valves 16, 18 always remains closed during such a pressure measurement and air-spring bellows 6 are consequently decoupled from compressed-air supply 12 and air vent 15, air-spring bellows 6 may not be aerated or vented, and therefore, a change in pressure is also not possible. On the other hand, pressure line 20, which is connected to pressure sensor 22 and is between 2/2-way directional control valve 14 and air-bellows valves 16, 18, may be subjected at any time to the pressure prevailing in each air-spring bellows 6 by opening corresponding air-bellows valve 16, 18, and therefore, the pressure in each air-spring bellows 6 may be individually measured. Pressure sensor 22 is therefore at a central point with respect to the flow path between 2/2-way directional control valve 14 and air-bellows valves 16, 18.

The loading state may be measured after each load change. Since pressure surges caused by traveling over uneven surfaces should not have an effect on the measuring results, a pressure measurement should or may take place at rest or while driving slowly.

To lower the level of the vehicle body, the levers connected to the vehicle axles turn the sliders of the rotary potentiometers of sensors 52, 53, 54, on the respective potentiometer paths, to the "lowering" position. Control unit ECU detects the voltage deviation and transmits electrical actuating signals to 3/2-way directional control valve 4 and air-bellows valves 16, 18 of valve block 2 assigned to rear axle HA, to 3/2-way valve 24 of valve block 8 assigned to front axle VA, as well as to air-bellows valves 42, 44 of valve block 34 of lifting axle LA.

To uniformly lower the vehicle body, all air-bellows valves 16, 18, 24, 42, 44, as well as 2/2-way directional control valve 14 of valve block 2 of rear axle HA switch through. In addition, 3/2-way directional control valve 4 of valve 2 assigned to rear axle HA is switched into its venting position, in which it connects 2/2-way directional control valve 14 to air vent 15 and blocks its pressure connection connected to compressed-air supply 12. Consequently, the pressure in air-spring bellows 6 of rear axle HA is reduced. At the same time, 3/2-way directional control valve 24 of front axle VA switches into the open position, in which the flow path between air-spring bellows 10 of front axle VA and pressure line 20 is opened, and consequently, compressed air from air-spring bellows 10 may flow through pressure line 20, open 2/2-directional control valve 14, and 3/2-way directional control valve 4 into air vent 15, until the setpoint level is reached. The same also applies to the flow path of the compressed air to be removed from air-spring bellows 36 of lifting axle LA, via open air-bellows valves 42, 44 and pressure line 20.

Figure 2:
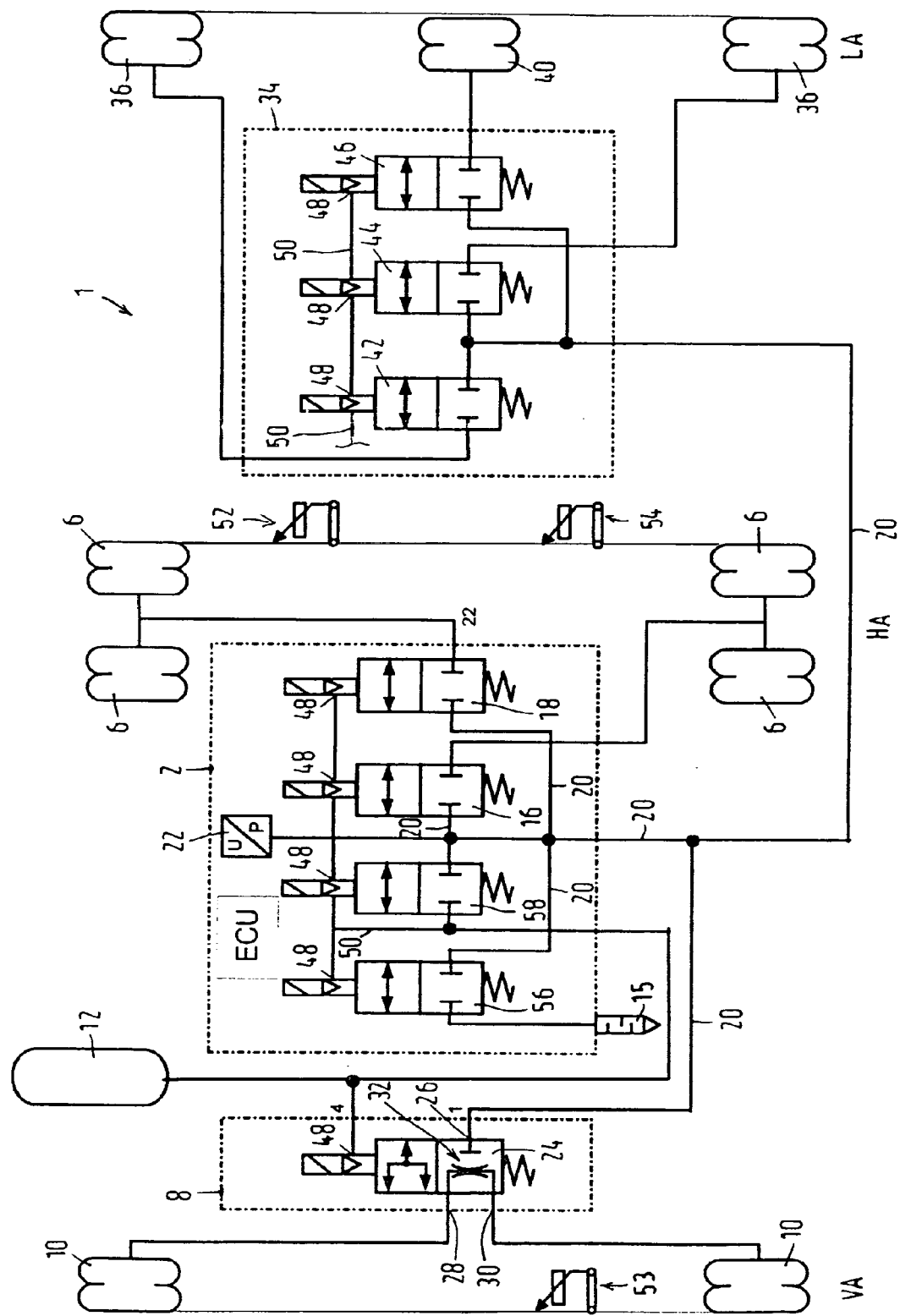
FIG. 2 shows a schematic functional circuit diagram of an air-suspension device according to a further specific embodiment of the present invention.

In the further exemplary embodiment of the present invention according to FIG. 2, the parts that are the same and act the same as in the preceding embodiment are denoted by the same reference numerals. In contrast to this, the valve block of rear axle HA contains, instead of a 3/2-way directional control valve, a first 2/2-way directional control valve 56, which either connects air vent 15 through to pressure line 20 and, therefore, to air-bellows valves 16, 18, 24, 42, 44 or blocks this flow path. In addition, a second, downstream 2/2-way directional control valve 58 is present, which either connects compressed-air supply 12 through to air-bellows valves 16, 18, 24, 42, 44 via pressure line 20 or blocks this flow path. First 2/2-way directional control valve 56 is therefore used, on one hand, to vent all air-spring bellows 6, 10, 36 and, on the other hand, to decouple the latter from air vent 15, in order to allow the static pressure in pressure line 20 to be measured by pressure sensor 22. In the same manner, second 2/2-way directional control valve 58 carries out a dual function, in that it, first of all, further directs the compressed air in compressed-air supply 12 to downstream air-bellows valves 16, 18, 24, 42, 44 and, secondly, decouples the latter from compressed-air supply 12 during a static pressure measurement.

THE LIST OF REFERENCE NUMERALS IS AS FOLLOWS 1 air-suspension device
2 valve block 4 3/2-way directional control valve
6 air-spring bellows
8 valve block
10 air-spring bellows
12 compressed-air supply
14 2/2-way directional control valve
15 air vent
16 2/2-way directional control valve
18 2/2-way directional control valve
20 pressure line
22 pressure sensor
24 3/2-way directional control valve
26 supply-pressure connection
28 connection
30 connection
32 throttle
34 valve block
36 air-spring bellows
40 lifting bellows
42 2/2-way directional control valve
44 2/2-way directional control valve
46 2/2-way directional control valve
48 control connection
50 pneumatic line
52 level sensor
53 level sensor
54 level sensor
56 2/2-way directional control valve
58 2/2-way directional control valve

What is claimed is:

1. An air suspension device for a vehicle with at least one axle, comprising:
a plurality of air-spring bellows;
at least one compressed-air supply;
an air vent;
a valve block for aerating the air-spring bellows with compressed air from the at least one compressed-air supply or for venting the air-spring bellows through the air vent; and
air-bellows valves being assigned to corresponding ones of the air-spring bellows, for individually aerating and venting the air-spring bellows, wherein the valve block includes the air-spring bellows, and wherein the valve block includes a valve device which simultaneously decouples the air-bellows valve from the compressed-air supply and from the air vent, and a pressure sensor measuring air pressure in a flow path between the valve device and the air-bellows valves is provided on an other side of corresponding air-spring bellows, the other side being different from that of the corresponding air-spring bellows with respect to the air-bellows valves;
wherein the pressure sensor is situated at a central point with respect to the flow path between the valve device and the air-bellows valve, so that the valve device ensures that the pressure in the flow path between the valve device and the respective air-bellows valve does not dynamically change and that a constant pressure sets in, so that the pressure sensor is not acted upon by the dynamic air-bellows pressures but is acted upon by the static air-bellows pressures necessary for measuring a load, and
wherein sequential connection of the air-bellows valves provides that the pressure sensor may be connected to the respective air-spring bellows for individually measuring pressure, so that only a single pressure sensor is used for any number of air-spring bellows.

2. The air-suspension device of claim 1, wherein the valve block containing the valve device, and the pressure sensor, are assigned to an axle of the vehicle.

3. The air-suspension device of claim 2, wherein the vehicle includes at least one additional axle, and wherein at least one of the air-spring bellows is assigned to the at least one additional axle, and is one of aerated and vented by the valve block assigned to the at least one additional axle.

4. The air-suspension device of claim 3, wherein the pressure sensor is connectable to the at least one air-spring bellows of each axle in a pressure-conducting manner by switching through the at least one air-bellows valves assigned to the at least one of the air-spring bellows.

5. The air-suspension device of claim 4, wherein the valve block of a rear axle of the axles includes a 3/2-way directional control valve, which connects the air vent or the compressed-air supply to a connection of the valve device.

6. The air-suspension device of claim 5, wherein the valve device includes a 2/2-way directional control valve, which switches the connection through to the air-bellows valves or blocks the connection.

7. The air-suspension device of claim 4, wherein the valve device includes a 2/2-way directional control valve, which connects the air vent through to the air-bellows valves or blocks this flow path.

8. The air-suspension device of claim 7, wherein the valve device includes a further 2/2-way directional control valve, which connects the compressed-air supply through to the air-bellows valves or blocks this flow path.

9. The air-suspension device of claim 3, wherein, on at least one of a rear axle and a lifting axle of the axles, the air-spring bellows is assigned a 2/2-way directional control valve in a form of an air-bellows valve.

10. The air-suspension device of claim 1, wherein at least one of the air-bellows valves includes a solenoid valve having a pneumatic pilot-operation connection for a pneumatic-electric pilot control and operation.

11. The air-suspension device of claim 10, wherein at least the valve block assigned to a rear axle, the pressure sensor, and an electronic control unit for the pneumatic-electric pilot control, are integrated in one unit.

12. The air-suspension device of claim 3, wherein a valve block assigned to a front axle of the axles includes a 3/2-way directional control valve, by which the air-spring bellows of the front axle are interconnected via a throttle device or connected to the air-bellows valves of the at least one additional axle.

13. The air-suspension device of claim 1, further comprising:
a rear axle.

14. The air-suspension device of claim 1, wherein the vehicle is a commercial vehicle.

15. The air-suspension device of claim 2, wherein at least one of the at least one of the air-spring bellows is assigned to a front axle and a lifting axle.

16. The air-suspension device of claim 1, wherein:
the vehicle includes at least one additional axle,
at least one of the air-spring bellows is assigned to the at least one additional axle, and is one of aerated and vented by the valve block assigned to the at least one additional axle,
the valve block containing the valve device, and the pressure sensor, are assigned to an axle of the vehicle,
the pressure sensor is connectable to the air-spring bellows of each axle in a pressure-conducting manner by switching through the air-bellows valves assigned to the air-spring bellows, the air-bellows valves including a solenoid valve having a pneumatic pilot-operation connection for a pneumatic-electric pilot control and operation, and at least the valve block assigned to a rear axle, the pressure sensor, and an electronic control unit for the pneumatic-electric pilot control, are integrated in one unit.

17. The air-suspension device of claim 16, wherein the valve block of a rear axle of the axles includes a 3/2-way directional control valve, which connects the air vent or the compressed-air supply to a connection of the valve device, and wherein the valve device includes a 2/2-way directional control valve, which switches the connection through to the air-bellows valves or blocks the connection.

18. The air-suspension device of claim 16, wherein the valve device includes a 2/2-way directional control valve, which connects the air vent through to the air-bellows valves or blocks this flow path, and wherein the valve device includes a further 2/2-way directional control valve, which connects the compressed-air supply through to the air-bellows valves or blocks this flow path.

* * * * *